United States Patent [19]

Graham

[11] Patent Number: 4,682,225

[45] Date of Patent: Jul. 21, 1987

[54] METHOD AND APPARATUS FOR TELEMETRY ADAPTIVE BANDWIDTH COMPRESSION

[75] Inventor: Olin L. Graham, Pearland, Tex.

[73] Assignee: The United States of America as represented by the Administrator of the National Aeronautics and Space Administration, Washington, D.C.

[21] Appl. No.: 775,990

[22] Filed: Sep. 13, 1985

[51] Int. Cl.⁴ .......................... H04N 7/12; H04N 7/18
[52] U.S. Cl. ..................................... 358/133; 358/105; 358/138
[58] Field of Search ....................... 358/133, 138, 105; 340/870.16

[56] References Cited

U.S. PATENT DOCUMENTS

| | | | |
|---|---|---|---|
| 3,201,065 | 8/1965 | Dunn | 244/1 |
| 3,224,709 | 12/1965 | Blizard | 244/1 |
| 3,794,270 | 2/1974 | Wilkens | 244/1 |
| 3,910,533 | 10/1975 | Cheatham et al. | 244/161 |
| 3,916,094 | 10/1975 | Marrone | 358/99 X |
| 4,219,847 | 8/1980 | Pinkney et al. | 358/105 X |
| 4,295,740 | 10/1981 | Sturger | 356/152 |
| 4,395,005 | 7/1983 | Ganssle | 244/161 |
| 4,414,580 | 11/1983 | Johnson et al. | 358/133 X |
| 4,556,986 | 12/1985 | Craig | 358/105 X |

*Primary Examiner*—E. A. Goldberg
*Assistant Examiner*—Patrick W. Foster

*Attorney, Agent, or Firm*—Hardie R. Barr; John R. Manning; Edward K. Fein

[57] ABSTRACT

Methods and apparatus are provided for automatic and/or manual adaptive bandwidth compression of telemetry.

An adaptive sampler (16) samples a video signal from a scanning sensor (12) and generates a sequence of sampled fields. Each field and range rate information from the sensor are then sequentially transmitted to and stored in a multiple adaptive field storage means (22). The field storage means (22) then, in response to an automatic or manual control signal, transfers the stored sampled field signals to a video monitor (24) in a form for sequential or simultaneous display of a desired number of stored field signals.

The sampling ratio of the adaptive sample (16), the relative proportion of available communication bandwidth allocated respectively to transmitted data and video information, and the number of fields simultaneously displayed are manually or automatically selectively adjustable in functional relation to each other and detected range rate. In one embodiment, when relatively little or no scene motion is detected, the control signal maximizes sampling ratio and cause simultaneous display of all stored fields, thus maximizing display resolution and bandwidth available for data transmission. When increased scene motion is detected, the control signal is adjusted accordingly to cause display of fewer fields. If greater resolution is desired, the control signal is adjusted to increase sampling ratio.

14 Claims, 2 Drawing Figures

METHOD AND APPARATUS FOR TELEMETRY ADAPTIVE BANDWIDTH COMPRESSION

ORIGIN OF THE INVENTION

The invention described herein was made by an employee of the U.S. Government and may be manufactured and used by or for the Government of the United States of America for governmental purposes without the payment of royalties thereon or therefor.

TECHNICAL FIELD

My invention relates to telemetry transmissions and particularly to methods and apparatus for adaptively compressing the bandwidth of such transmissions. Optimizing use of discrete bandwidths of the electromagnetic spectrum is important in many applications such as in spacecraft docking systems wherein vast amounts of video information and data must be transmitted in a limited finite bandwidth.

DISCLOSURE OF INVENTION

In accordance with the present invention, I provide an automatically or manually adaptive bandwidth compression system and method. The invention is particularly suited for use in space communication systems wherein a limited bandwidth is available for transmission from a spacecraft of both video and data signals such as vehicle data or the like.

Accordingly, a scanning sensor generates a sequence of fields of video data and range rate data corresponding to a visual image within the sensor's field of view. Each field is sampled by an adaptive sampler at a rate corresponding to a preselected number of pixels per line. A sequence of low-resolution sampled fields for each field as well as the range rate data are thus generated, transmitted to a remote location, and stored in a field storage. A number of thus-stored low-resolution fields are retrieved from the storage and simultaneously displayed on a monitor as a function of desired resolution of the image.

The system and method of the present invention possess the advantage of being both manually and automatically controllable and thus adaptive as a function of parameters such as range rate or the like in terms of the sampling ratio, number of low-resolution frames of video information simultaneously displayed for increased resolution as desired, and channel mix or proportion of available down link communication bandwidth allocated between data and video signals.

More particularly, a manual controller may generate control signals which are delivered to the adaptive sampler and/or field storage in response to remote human observance of the transmitted range rate and image displayed on the monitor. Such control signals may regulate either alone or in combination the sample rate of the sampler, the channel mix, and the number of low-resolution fields simultaneously displayed on the monitor.

Alternatively, an automatic control signal may also automatically be generated and delivered to the adaptive sampler, a vehicle data generator, transmitter, and/or field storage to either individually or in combination regulate the sample rate, channel mix, and number of low-resolution fields retrieved from the field storage and simultaneously displayed on the monitor.

BRIEF DESCRIPTION OF THE DRAWINGS

The details of my invention will be described in connection with the accompanying drawings, in which.

BEST MODE FOR CARRYING OUT THE INVENTION

Figure 1:
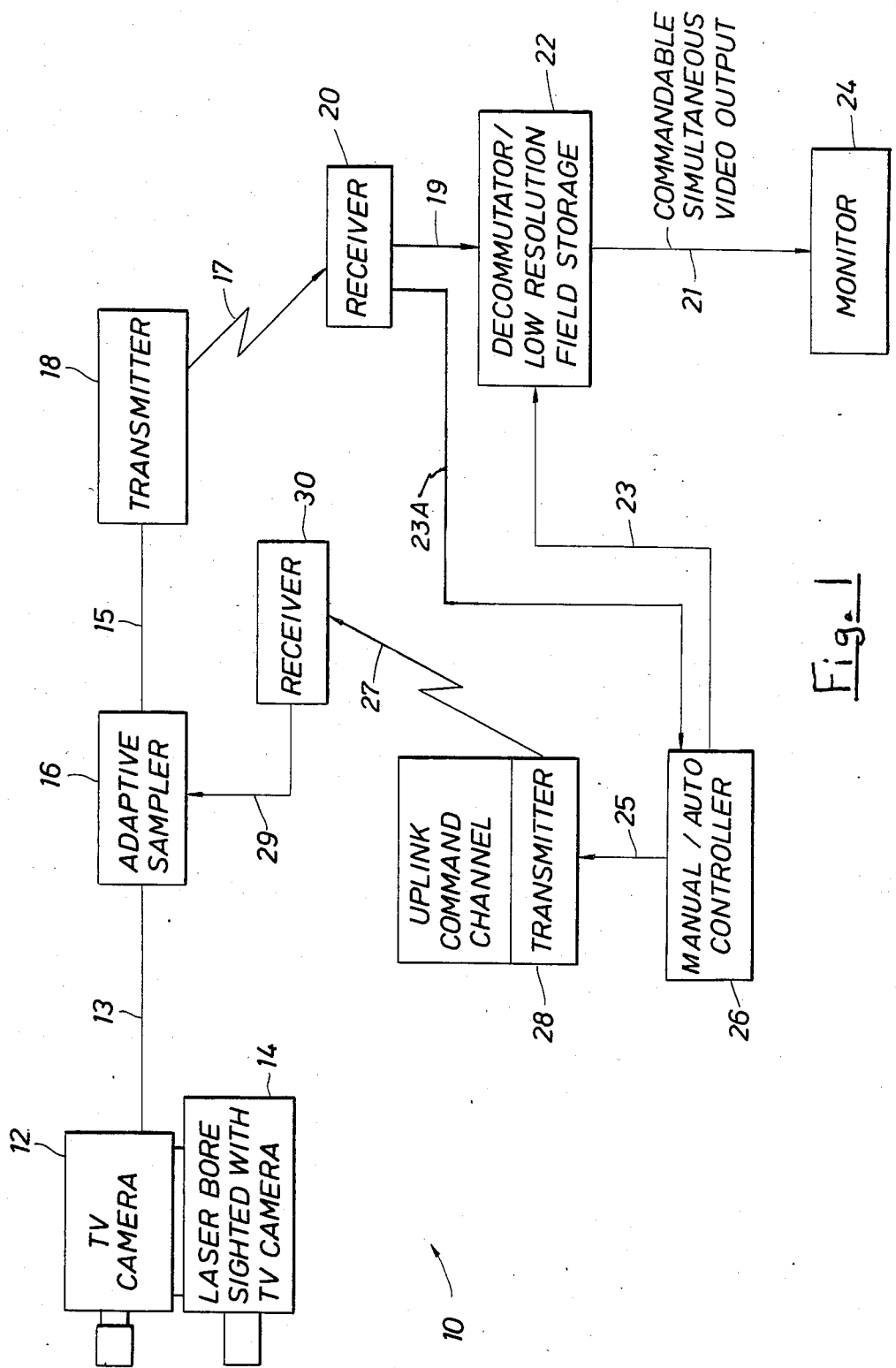
FIG. 1 is a functional schematic block diagram of the present invention.

Referring first to FIG. 1, a general system 10 may be seen depicted therein in accordance with my invention. An appropriate imaging device 12 such as a television camera or the like generates electronic video information signals corresponding to the scene upon which camera 12 is trained. A ranging device 14 such as a laser ranger bore-sighted with the camera 12 and controlled by a pan tilt device well known in the art, for example, generates information regarding objects within the field of view of the camera 12. More particularly, the ranging device 14 will generate electronic data signals corresponding to the range, velocity or range rate, and spatial orientation of such objects relative to the camera 12.

These data signals and the video information signal will thence be delivered as schematically shown by signal 13 to an adaptive sampler circuit 16. The purpose of sampler circuit 16 is basically to sample the video signal in a manner to be hereinafter described, and to deliver the sampled signal to a suitable transmitter 18 for transmission to a remote source.

The transmitter 18 may also be adapted to transmit additional information such as the aforementioned information generated by ranging device 14 and any other desired information or control signals. Accordingly, signal 15 in FIG. 1 is intended to functionally depict delivery of this additional information, including the ranging information, as well as the video information generated by camera 12, from the sampler 16 to transmitter 18.

The information contained in signal 15 is thence relayed by means of a suitable transmitter 18 as transmission signal 17 to a remote location wherein it is received by the receiver 20. In addition to receiving the control and other data and information signals transmitted from transmitter 18 in a manner to be hereinafter described, the receiver 20 also will preferably decode the sampled video information signals passed from the sampler 16 to transmitter 18 into a serial video data stream signal 19. These decoded video signals 19 will thence be delivered to a decommutator/low resolution field storage 22 wherein they will be stored. The control and other data signals will be delivered as data/control signal 23A to a manual/automatic controller 26.

Still referring to FIG. 1, the controller 26 may be provided for generating a control signal 23 which is delivered to field storage 22. The control signal 23 may be either manually generated (such as in response to information provided in data/control signal 23A or video information appearing on a display monitor of the scene viewed by camera 12). Alternatively, signal 23 may be automatically generated in response to the data/control signal 23A.

The field storage 22 is preferably of a multiple field adaptive type in which digital representations of a plurality of fields corresponding to the scene viewed by camera 12 may be stored for selective sequential retrieval. In the system depicted in FIG. 1, these retrieved digitized field signals 21 are delivered from field storage 22 to an appropriate display monitor 24 wherein they are converted to correlative visual images of fields in a well-known manner.

The field storage 22 is referred to herein as adaptive in that the manner of delivery of the video image information stored therein as field signal 21 may be selectively controllable in a number of ways in response to control signal 23 as desired.

As but one simple example, the range rate of objects within the field of camera 12 which are desired to be viewed may be determined manually by observation of monitor 24 or by indications of such range rate from data/control signal 23A which may be displayed by controller 26. Alternatively, such range rate may be detected automatically in controller 26, also in response to data/control signal 23A which includes the range rate signal generated by ranging device 14. In response to these indications of range rate, it may be decided either manually or automatically by automatic control criteria within controller 26 that the scene motion of an object to be viewed relative to camera 12 is comparatively slow or zero and thus a higher resolution video display thereof may be perceived and is desired on monitor 24. Accordingly, an appropriate control signal 23 may be automatically or manually generated by control 26. This signal 23 will cause field storage 22 to deliver as field signal 21 digital representations of a plurality of fields stored in storage 22 which will be simultaneously superimposed on monitor 24 to effect such improved resolution.

Conversely, in response to these range rate indications, it may be decided that the motion of the object to be viewed is comparatively fast in which case a lower resolution video display thereof may be desired on monitor 24. In this instance, the appropriate control signal 23 will be automatically or manually generated by controller 26 so as to cause the field storage 22 to deliver as field signal 21 digital representations of a lesser plurality of fields stored in storage 22 for superimposition on monitor 24.

Still referring to FIG. 1, a second control signal 25 generated by controller 26 may be seen delivered to an uplink command channel transmitter 28. This control signal 25 will be transmitted as second transmission signal 27 to a control receiver 30. In response to the second transmission signal 27 received by the control receiver 30, the receiver 30 decodes this transmitted signal 27 and, in response thereto, generates and delivers an uplink command signal 29 to adaptive sampler circuit 16.

As but one illustrative example of the function of the just-described second transmission signal 27 and correlative command signal 29, it will be recalled that data other than video information may be transmitted from the transmitter 18 - to - receiver 20 link which will occupy a given bandwidth. In applications relating to space docking systems for example, such information might include various telemetry signals relating to condition of the spacecraft such as thruster firings or the like. Accordingly, only a limited bandwidth may remain in the transmitter 18-receiver 20 communication link for conveying video information of images viewed by camera 12. Thus, the signal 27 will include information from controller 26 delivered to the sampler circuit 16 as command signal 29 which will control the rate of sampling of the adaptive sampler circuit 16. More particularly, the control signal 29 will control the rate of sampling of video information present on signal 13 to correspond to the bandwidth of the transmitter 18-receiver 20 communication link which is available for transmission of video data.

Figure 2:
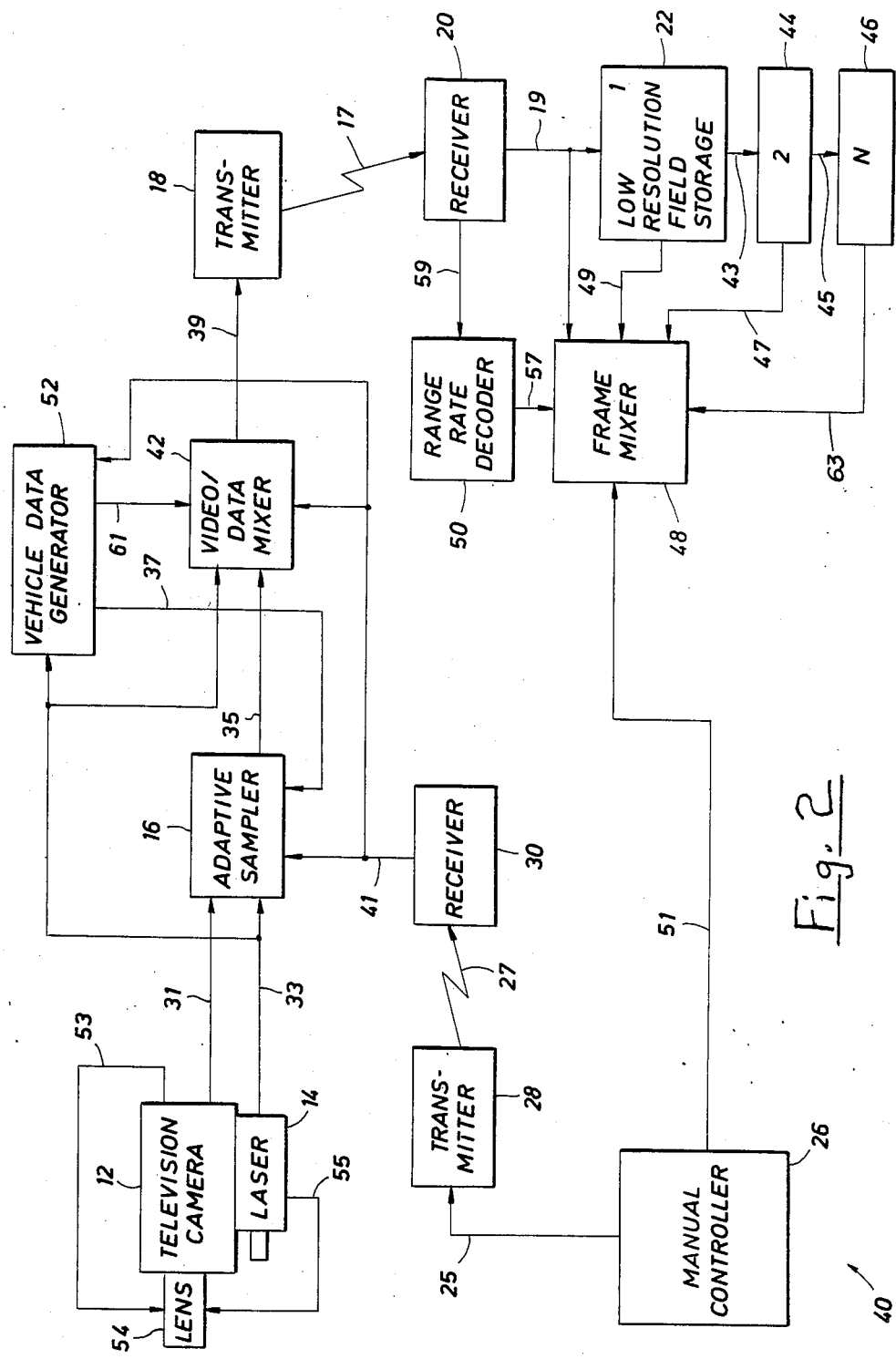
FIG. 2 is a more detailed functional schematic block diagram of the system depicted in FIG. 1.

Referring now to FIG. 2, there may be seen depicted therein a system 40 represented by the more detailed schematic diagram of a preferred embodiment of the system 10 illustrated in FIG. 1. In space vehicle systems, a great deal of information in addition to video signals is generated by the spacecraft and telemetered to the earth, such signals being indicated as vehicle data signals 61 generated by vehicle data generator 52. These signals 61 may represent any instrumentation and control information as desired, such as status information of vehicle components, biomedical parameters of the crew, and the like.

In like manner, as aforesaid, it is desirable to also provide video signals 31 as well as range, range rate, and orientation data signals 33 which are delivered to sampler 16. The sampler 16 will sample the video signal 31 as desired and deliver a sampled signal 35 to a video/data mixer 42 comprised of the sampled video signal 31 interlaced with the range data 33. The video/data mixer 42 will mix this sampled signal 35 with the vehicle data signals 61, and deliver the mixed signal 39 to transmitter 18 for delivery as transmitted signal 17 to receiver 20.

In FIG. 2, a slightly more detailed schematic representation of the manner for generating appropriate visual imagery of video signals 31 is shown. The laser ranging system 14 and television camera 12 generate iris signal 53 and signal 55 for controlling focus and the like, these signals 53 and 55 automatically operating lens 54 to produce video signal 31 as desired.

The range signal 33 is delivered to sampler 16 for the aforesaid purpose of being intermixed with the video signal 31 for transmission to receiver 20. However, it will be noted that this range signal 33 is also delivered to vehicle data generator 52 and data mixer 42. The reason for this is as follows. It will be recalled that it is a feature of this invention to provide for automatic adaptive sampling of the video signal 31 as a function of parameters such as the available bandwidth for transmission of video information relative to vehicle data, the range and range rate of objects in view of the camera 12, and the desired resolution of the resultant video display of such objects. Such range and range rate data, in accordance with the particular automatic control strategy adopted, will affect the generation of vehicle data as well as the mixing of this data with sampled signal 35, thus explaining delivery of range signal 33 to vehicle data generator 52 and video/data mixer 42.

In one operational scheme to be hereinafter described in greater detail, dependent upon defined protocols, it may be necessary to provide during a given time frame and for a given communication link bandwidth more vehicle data relative to video data or vice-versa. Accordingly, an automatic control signal 37 is delivered from generator 52 to sampler 16 to control the sample rate of sampler 16 as a function of the vehicle data rate desired.

Still referring to FIG. 2, the receiver 20 is provided for receiving and decoding the video, vehicle data, range, range rate, and orientation signals 17. The video information signal 19 is delivered to the low resolution field storage 22 wherein each field is stored. The present invention contemplates simultaneous display on monitor 24 of any desired number of fields comprising a frame of video data stored in field storage 22 in a manner to be described in greater detail, the number of simultaneous fields displayed being dependent upon the desired visual imagery resolution, range rate, and the like. Accordingly, video signal 49 from field storage 22 is intended to indicate that in some instances all fields comprising a frame of video information may be delivered to an appropriate frame mixer 48. The frame mixer 48 generates a video output signal 21 which is a composite signal of all frames delivered to the mixer 48 for display on a video monitor 24.

A plurality of N boxes are also shown in FIG. 2 as boxes 44 ... 46, each having delivered thereto respective video signals 43 and 45 and having respective video output signals 47 and 63 delivered to the mixer 48. This arrangement of boxes is intended to schematically indicate that any given number of low-resolution or sampled frames stored in storage 22 may be retrieved from the field storage 22 as signals 43, 45, etc., and delivered to the frame mixer 48 on respective signals 47, 63, etc., wherein they are mixed and thence delivered as composite video signal 21 for simulaneous display on monitor 24 as desired.

As in the case of the system depicted in FIG. 1, a manual controller 26 may be provided in the system illustrated in FIG. 2 which will deliver control signals 51 to the frame mixer 48. This control signal 51 will instruct the frame mixer 48 to retrieve any desired number of frames of video signal information stored in the storage 22 as described and to output them as signal 21 for display on monitor 24 in any desired sequence and combination of low-resolution frames.

The receiver 20 receives range and range rate information carried on transmitted signal 17 and delivers such information as a range rate signal 59 to a range rate decoder 50. The decoder 50 decodes this information and generates an automatic control signal 57 which is delivered to mixer 48. It will be recalled that it is a feature of this invention to provide for automatic control if desired of the number of fields stored in field storage 22 for a given frame of video data which are simultaneously displayed on monitor 24.

More particularly, this feature provides for controlling the number of fields simultaneously displayed on monitor 24 in functional relation to the range rate or rate of motion of an object within the field of view of lens 54 relative to the lens 54. Accordingly, this automatic control signal 57 will control the mixer 48 to cause it to retrieve appropriate desired ones of the frames in storage 22, 44, and 46, mix them together, and provide a mixed signal 21 for simultaneous display of the selected frames on monitor 24 as a function of the range rate decoded in decoder 50.

It will be noted that for a given telemetry downlink such as transmitted signal 17, a finite bandwidth is available for transmission of video information signals of the visual image presented to camera 12 as well as vehicle data derived by generator 52 and range, range rate, and object orientation data signals 33. Accordingly, at some times it may be desirable to utilize a greater portion of this available telemetry link bandwidth for vehicle data and less for video information, or vice-versa. For example, during docking operations of space vehicles, it may be desirable to provide higher resolution visual imagery and less vehicle data requiring a higher attendant portion of the available bandwidth for such information relative to the vehicle data information. Thus, for a given bandwidth available for video information, it may be desirable to adjust the sample rate or number of samples per visual line of this video information which are sampled by the sampler 16 for transmission.

For the foregoing reasons, with further reference to FIG. 2, the manual controller 26 may also preferably generate a control signal 25 which is delivered to the transmitter 28 and transmitted as uplink control signal 27 to receiver 30. Receiver 30 then delivers this received decoded control signal as control signal 41 to adaptive sampler 16, video/data mixer 42, and vehicle data generator 52. In this manner, the relative proportion of video data to vehicle data occupying the given transmission bandwidth and mixed together in mixer 42 may be manually or automatically controlled by signal 27 as well as the aforementioned sample rate of the video information presented to sampler 16.

Now that a general overall description of the system and method of the present invention have been given, a more detailed discussion follows of the various modes of operation and features thereof. First, with respect to the details of a representative video scanning technique suitable for the present system, such a technique might be a conventional TV raster-scan. In this scan, a typical video image comprises a frame of information. Each frame, in turn, comprises a first or even field of 250 horizontal lines displayed during a first time interval followed by display during a second time interval of a second or odd field of 250 lines spatially interlaced between those of the even field, with each field being displayed at a 30 Hz rate.

Each line comprises 400 discrete locations spaced evenly across the screen of monitor 24 which may be selectively illuminated to a desired degree. Each such location and the level of illumination thereof, in turn, may be referred to herein as a picture element or pixel. These frames of video data, each comprising a plurality of lines of pixels, will be generated by any appropriate scanning sensor such as the television camera 12, resulting in the video signal 13 or 31, respectively.

It will be appreciated that in order for a visual image of an object the camera 12 is trained upon to appear on monitor 24, it is conventional to provide a time sequence of such frames of video data to the monitor 24, represented as video signal 21. The even and odd fields of each frame transmitted from the transmitter 18 to receiver 20 may consist of all pixels in each field, provided sufficient bandwidth is available for such a transmitted signal 17 for maximum visual resolution of the image.

However, it will further be appreciated that only a sampling of such pixels may be transmitted, with remaining ones to be transmitted subsequently in order to conserve bandwidth for transmission of other data such as vehicle data generated by the generator 52.

In situations of relatively fast scene motion wherein resolution is less perceptible, these remaining pixels may be omitted from transmission.

It will now be apparent that the adaptive sampler 16 is provided for this purpose of sampling pixels. The field storage 22 will be provided to store all these successively sampled and transmitted fields. In response to either the control signals 23 or 51, these stored sampled fields will be sequentially retrieved from storage and simultaneously displayed on monitor 24 with the number of such frames being simultaneously displayed at a given time being selected in accordance with the desired resolution.

With the foregoing in mind, illustrative examples of specific modes of operation of the present invention will follow.

EXAMPLE 1

In this illustration, it will be assumed, for simplicity, that the sampling rate of sampler 16 is set to the maximum rate permitted by available communication bandwidth. A 60 Hz, 525 line positive-interlaced video signal from TV camera 12 would produce, for example, 400 pixels per line with the sampler 16 sampling every 16th pixel. The first encoded even field would thus consist of 25 digitally encoded pixels per line, and 250 such encoded lines, with time corresponding to $12\frac{1}{2}$ of the $262\frac{1}{2}$ lines per field being reserved for vertical retrace.

In like manner, the first encoded odd field of a frame of video data would produce a 25 pixel per line by 250 line resolution. For each subsequent sampled field, a different set of 25 horizontal pixels in each line are encoded until 32 fields (16 even and 16 odd) have been subsequently produced. Each such field (referred to as a low resolution field in that not all pixels available in a frame are sampled and transmitted in a given field) will be transmitted as signal 17 to receiver 20 and stored in field storage 22.

A full resolution frame of video resolution would thus consist of 32 total fields (16 even and 16 odd) of sampled pixels. It is contemplated that any desired number of such fields comprising a given frame may be simultaneously displayed on monitor 24, dependent upon the resolution. It is further contemplated that this desired resolution may, in turn, be a function of the detected scene motion or range rate.

Thus, as illustrated in subsequent examples, in a situation of low or no scene motion or other situations wherein high video imagery resolution is desired, all low-resolution fields of a given frame may be simultaneously displayed. Conversely, the number of such fields for a given frame simultaneously displayed on monitor 24 may desirably vary inversely as a function of scene motion, desired resolution, and available video bandwidth whereby, in some instances, only a few or even only one of the 32 fields is displayed at a given time interval.

The number of fields retrieved from storage 22 and simultaneously delivered to and displayed by monitor 24 may be varied manually by control signal 23 or 51. However, it will be recalled that the range rate data will preferably be encoded and transmitted as part of signal 17 and received by receiver 20, and thereafter transferred as data/control signal 23A to controller 26. In response thereto, the controller 26 may generate an automatic control signal 23 to automatically adjust the number of low resolution fields in storage 22 which are delivered to monitor 24 for simultaneous display in functional response to the range rate information received by controller 26.

The available bandwidth of communication signal 17 for video information may desirably vary dynamically dependent upon bandwidth which must be used for other data and desired resolution of video images which, in turn, may be functionally related to observed scene motion as desired. It is accordingly specifically contemplated that the channel capacity or proportion of bandwidth available for transmitted video information may be used to either manually or automatically set the sampling rate, e.g., the number of pixels per line sampled and thus the number of fields required for transmission per frame of video. In one mode, in response to manual control, a control signal 27 from transmitter 28 to receiver 30 will cause the receiver 30 to generate a command signal 29 to adjust the sampling rate of the sampler 16 manually. Alternatively, with reference to FIG. 2, the vehicle data generator 52 may generate an automatic control signal 37 delivered to the adaptive sampler 16 so as to adjust the sampling rate of the sampler 16 in functional relation to the amount of data present in the generator 52 which needs to be transmitted to the receiver 20.

EXAMPLE 2

In this example, it will be assumed that the range rate signal 33 (or the range rate portion of signal 13 in the embodiment of FIG. 1) is very low or zero, indicating very little scene motion or motion of the objects which camera 12 is focused upon. The neurosensory ability of a human observer to perceive resolution of a visual image varies inversely as a function of the perceived motion of the image.

Accordingly, in this situation of little or no motion, it may be desirable to transmit high resolution images, inasmuch as they can be so perceived by the observer. It may further be desirable to transmit such higher resolution imagery simply because the slow or no scene motion situation may represent an extremely critical docking maneuver phase of a spacecraft mission wherein such images are important to receive at a ground control station.

In such a situation, the adaptive sampler 16 may be set for a maximum sample ratio such as 32:1 in one of two ways. In an automatic mode, the sampler 16 may adjust to this sample ratio in functional response to the range rate indication delivered to it as signal 33 or 13. Alternatively, it will be recalled that this range rate information will also be transmitted between each field of video information in the dead or vertical retrace time of a raster scan refresh-type video signal, as conventionally known in the art, to receiver 20 where it may then be perceived by a ground observer. The observer may then, in functional response to this perceived range rate signal, generate a manual control signal 25 with controller 26 which will be transmitted as signal 27 to the receiver 30. Receiver 30, in turn, will transmit this control signal as signal 29 or 41 to effect manual adjustment of the sample rate of sampler 16 as desired.

This 32:1 sample ratio will mean that in a sampled field of video data approximately 12 pixels in each line will be sampled and transmitted, such as pixel number 1, 32, . . . , 354, 386. During the next sampled field, sampler 16 may then select pixel numbers 2, 33, . . . , 355, 387, and so on until 32 sequential sampled and transitted fields have transmitted all 400 pixels per line. It will be noted that rather than selecting during a sampling interval pixels immediately adjacent those previously sampled, it is well known in the art to select various sampling patterns such as a random selection or the like to avoid video image crawl, aliasing, or the like.

The frame mixer 48 will be set either manually or automatically in a manner previously described to playback simultaneously on monitor 24 all 32 stored fields comprising each frame. By selecting a maximum video sample ratio such as 32:1, this preserves a maximum amount of communication link bandwidth for other data such as vehicle data from generator 52 to be transmitted over the communication downlink. At the same time, however, video imagery resolution does not suffer due to the simultaneous playback of a large number of low resolution fields.

EXAMPLE 3

In this illustration, it will be assumed that relatively greater scene motion and range rate is occurring and that the sampler 16 is still set for a maximum sampling ratio, such as sampling every 32nd pixel of each line. In this instance, the field storage 22 will, in a manner previously described, accordingly be set to retrieve and playback on the monitor 24 only a few or even one of the low resolution fields of a given frame. As detected range rate and thus object motion decreases, due to the increased ability hereinbefore noted of a human observer to perceive resolution, the field storage 22 may be adjusted so as to cause an increased percentage of fields per frame of video data to be simultaneously displayed on the monitor 24, resulting in a greater resolution video image of the object being observed by the camera 12. With such increased resolution of an object in motion by this method, at some point the perceived image may appear to be smeared. At this point, the sample ratio of the adaptive sampler 16 may be reduced to, for example, a ratio of 16:1 or less whereby during a given sampling of a line of video information an increased number of pixels per line are sampled in each field. This instruction to sampler 16 to begin sampling at a reduced ratio may be effected in one of two ways. First, in response to a manual control signal generated by the observer, the controller 26 can generate a control signal 25 which will be relayed to the sampler 16. In the alternative, however, the controller 26 will preferably contain range rate information delivered from data/control signal 23A and will further contain information regarding the previously used sample ratio of the sampler 16. In functional response to these two parameters, the controller 26 will automatically generate an automatic control signal 25 which will be relayed to the sampler 16 to lower the sampling ratio thereof. It will of course be readily apparent that by thus reducing the sample ratio and increasing the number of pixels per line which are sampled, additional communication bandwidth will be required to transmit digital representations of these fields which are more information-laden than those previously described. This will of course in general be accomplished at the expense of other data density such as vehicle data also being transmitted over the downlink on transmission signal 17.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

What is claimed is:

1. A system for producing a display of an image of an object comprising:
    imaging means for deriving a video signal corresponding to said object;
    adaptive sampler means for sampling said video signal at a sampling rate and sequentially deriving a plurality of sampled low-resolution fields;
    first transmitter means for transmitting said fields;
    first receiver means for receiving said transmitted fields;
    field storage means for storing said received fields;
    monitor means for simultaneously displaying an electronic image of a preselected number of said stored fields;
    controller means for generating a control signal, wherein said control signal varies as a function of the range or range rate of said object relative to said imaging means and wherein said system further includes means for varying the number of said preselected stored fields simultaneously displayed by said monitor means in response to said control signal.

2. A system for producing a display of an image of an object comprising:
    imaging means for deriving a video signal corresponding to said object;
    adaptive sampler means for sampling said video signal at a sampling rate and sequentially deriving a plurality of sampled low-resolution fields;
    first transmitter means for transmitting said fields;
    first receiver means for receiving said transmitted fields;
    field storage means for storing said received fields;
    monitor means for simultaneously displaying an electronic image of a preselected number of said stored fields;
    range rate means for generating a range rate signal indicating rate of motion of said object relative to said imaging means, said range rate signal being transmitted by said first transmitter means and received by said first receiver means;
    controller means for generating a control signal in response to said received range rate signal; and wherein said system further includes
    means for varying the number of said preselected stored fields simultaneously displayed by said monitor means in response to said control signal.

3. The system of claim 2, wherein: said controller means generates a remote control signal in response to said received range rate signal; and wherein said system further includes
    second transmitter means for transmitting said remote control signal;
    second receiver means for receiving said transmitted remote control signal; and
    means for adjusting said sampling rate of said sampler means in response to said received remote control signal.

4. A system for producing a display of an image of an object comprising:
    imaging means for deriving a video signal corresponding to said object;
    adaptive sampler means for sampling said video signal at a sampling rate and sequentially deriving a plurality of sampled low-resolution fields;
    first transmitter means for transmitting said fields;
    first receiver means for receiving said transmitted fields;
    field storage means for storing said received fields;
    monitor means for simultaneously displaying an electronic image of a preselected number of said stored fields;

range rate means for generating a range rate signal indicating rate of motion of said object relative to said imaging means; and means for adjusting said sampling rate of said sampler means in response to said range rate signal.

5. A system for producing a display of an image of an object comprising:

imaging means for deriving a video signal corresponding to said object;

adaptive sampler means for sampling said video signal at a sampling rate and sequentially deriving a plurality of sampled low-resolution fields;

first transmitter means for transmitting said fields;

first receiver means for receiving said transmitted fields;

field storage means for storing said received fields;

monitor means for simultaneously displaying an electronic image of a preselected number of said stored fields;

range rate means for generating a range signal indicating rate of motion of said object relative to said imaging means, and wherein said transmitter means transmits said range rate signal and said receiver means receives said transmitted range rate signal;

controller means for generating a remote control signal in response to said received said range rate signal;

second transmitter means for transmitting said remote control signal;

second receiver means for receiving said transmitted remote control signal; and means for varying said sampling rate of said sampler means in response to said received remote control signal.

6. A system for producing a display of an image of an object comprising:

imaging means for deriving a video signal corresponding to said object;

adaptive sampler means for sampling said video signal at a sampling rate and sequentially deriving a plurality of sample low-resolution fields;

first transmitter means for transmitting said fields;

first receiver means for receiving said transmitted fields;

field storage means for storing said received fields;

monitor means for simultaneously displaying an electronic image of a preselected number of said stored fields; range rate means for generating a range rate signal indicating rate of motion of said object relative to said imaging means;

data generating means for generating a non-video data signal; and mixer means for generating a composite signal transmitted by said first transmitter having a relative proportion of said non-video signal to said fields controlled by said range rate signal.

7. A system for producing a display of an image of an object comprising:

imaging means for deriving a video signal corresponding to said object;

adaptive sampler means for sampling said video signal at a sampling rate and sequentially deriving a plurality of sampled low-resolution fields;

first transmitter means for transmitting said fields;

first receiver means for receiving said transmitted fields;

field storage means for storing said received fields;

monitor means for simultaneously displaying an electronic image of a preselected number of said stored fields;

range rate means for generating a range rate signal indicating rate of motion of said object relative to said imaging means;

data generator means for generating non-video data signals;

mixer means for generating a composite signal having a relative proportions of said non-video signals to said fields;

remote control generator means for generating a remote control signal;

second transmitter means for transmitting said remote control signal;

second receiver means for receiving said transmitted remote control signal; and wherein said first transmits and said first receiver receives said range rate signal;

said remote control generator means generates said remote control signal in functional response to said received range rate signal; and said mixer means generates said non-video signals and said fields in said relative proportion controlled by said received remote control signal.

8. A method for producing a display of an image of an object comprising:

deriving a video signal corresponding to said object;

sampling said video signal at a sampling rate to sequentially derive a plurality of low-resolution fields;

transmitting said fields from a first to a second location;

receiving said fields at said second location;

storing said received fields;

simultaneously displaying an image of a preselected number of said stored fields;

generating a control signal;

varying the number of said preselected stored fields simultaneously displayed by said monitor means in response to said control signal; and varying said control signal as a function of the range or range rate of said object.

9. A method for producing a display of an image of an object comprising:

deriving a video signal corresponding to said object;

sampling said video signal at a sampling rate to sequentially derive a plurality of low-resolution fields;

transmitting said fields from a first to a second location;

receiving said fields at said second location;

storing said received fields;

simultaneously displaying an image of a preselected number of said stored fields;

generating a range rate signal indicating rate of motion of said object at said first location;

transmitting said range rate signal from said first location to said second location;

receiving said range rate signal at said second location;

generating a control signal in response to said received range rate signal; and varying the number of said preselected stored fields simultaneously displayed in response to said control signal.

10. The method of claim 9, further including:

generating a remote control signal in response to said received range rate signal;

transmitting said remote control signal from said second to said first location;

receiving said remote control signal at said first location; and adjusting said sampling rate in response to said received remote control signal.

11. A method for producing a display of an image of an object comprising:

deriving a video signal corresponding to said object;

sampling said video signal at a sampling rate to sequentially derive a plurality of low-resolution fields;

transmitting said fields from a first to a second location;

receiving said fields at said second location;

storing said received fields;

simultaneously displaying an image of a preselected number of said stored fields;

generating a range rate signal indicating rate of motion of said object; and adjusting said sampling rate in response to said range rate signal.

12. A method for producing a display of an image of an object comprising:

deriving a video signal corresponding to said object;

sampling said video signal at a sampling rate to sequentially derive a plurality of low-resolution fields;

transmitting said fields from a first to a second location;

receiving said fields at said second location;

storing said received fields;

simultaneously displaying an image of a preselected number of said stored fields;

generating a range rate signal indicating rate of motion of said object;

transmitting said range rate signal from said first to said second location;

receiving said range rate signal at said second location;

generating a remote control signal in response to said received range rate signal;

transmitting said remote control signal from said second to said first location;

receiving said remote control signal at said first location; and varying said sampling rate in response to said received remote control signal.

13. A method for producing a display of an image of an object comprising:

deriving a video signal corresponding to said object;

sampling said video signal at a sampling rate to sequentially derive a plurality of low-resolution fields;

transmitting said fields from a first to a second location;

receiving said fields at said second location;

storing said received fields;

simultaneously displaying an image of a preselected number of said stored fields;

generating a range rate signal indicating rate of motion of said object;

generating a non-video data signal;

generating a composite signal transmitted from said first to said second location having relative proportions of said non-video signal to said fields controlled by said range rate signal.

14. A method for producing a display of an image of an object comprising:

deriving a video signal corresponding to said object;

sampling said video signal at a sampling rate to sequentially derive a plurality of low-resolution fields;

transmitting said fields from a first to a second location;

receiving said fields at said second location;

storing said received fields;

simultaneously displaying an image of a preselected number of said stored fields;

generating a range rate signal indicating rate of motion of said object;

generating a non-video data signal;

generating a composite signal having a relative proportions of said non-video signal to said fields;

transmitting said range rate signal from said first to said second location;

receiving said range rate signal at said second location;

generating a remote control signal in response to said received range rate signal;

transmitting said remote control signal from said second to said first location; and adjusting said relative proportion of said non-video signal to said fields in functional response to said received remote control signal.

* * * * *